Aug. 31, 1926.

H. R. SEIFERT 1,597,926

APPARATUS FOR USE IN FORMING PISTON RINGS

Filed Jan. 12, 1923     3 Sheets-Sheet 1

Inventor
Henry R. Seifert
By his Attorneys

Aug. 31, 1926.
H. R. SEIFERT
1,597,926
APPARATUS FOR USE IN FORMING PISTON RINGS
Filed Jan. 12, 1923 3 Sheets-Sheet 2
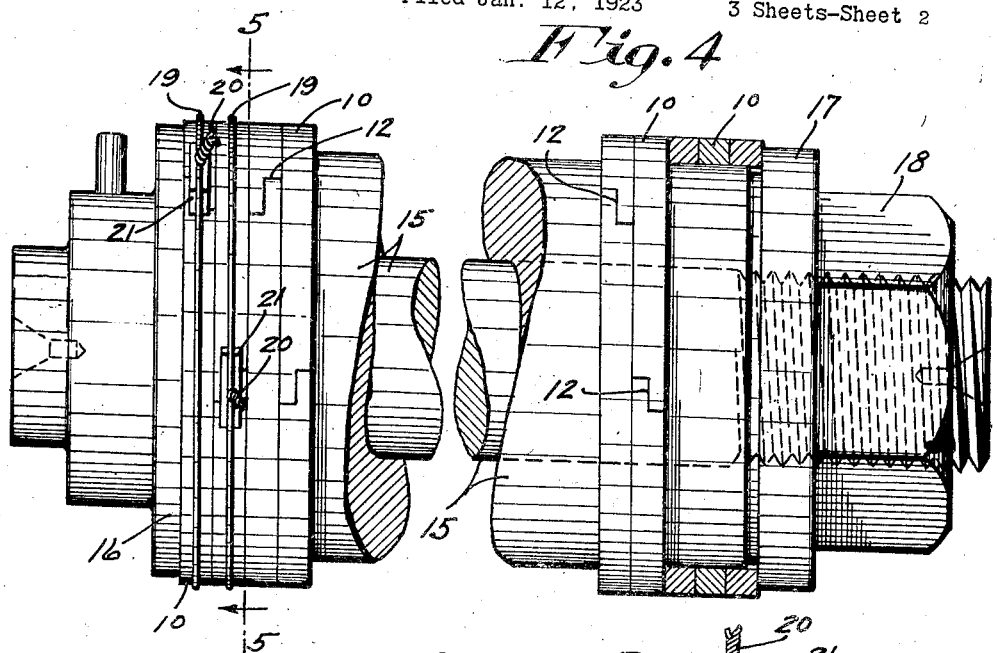
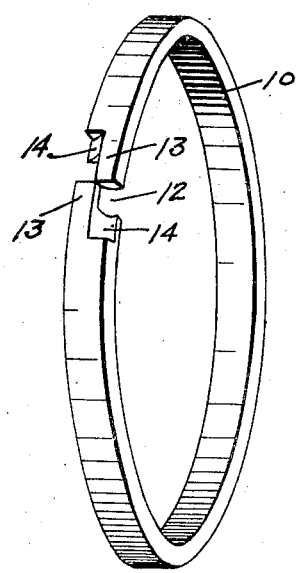
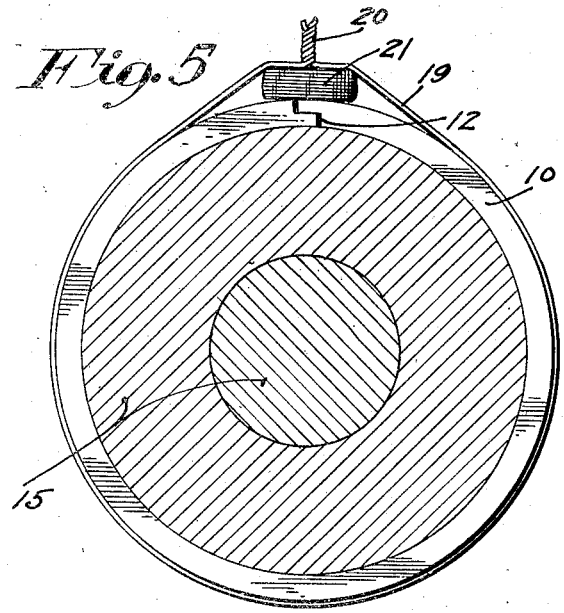
Inventor
Henry R. Seifert
By his Attorneys Aug. 31, 1926.

H. R. SEIFERT 1,597,926

APPARATUS FOR USE IN FORMING PISTON RINGS

Filed Jan. 12, 1923 3 Sheets-Sheet 3

Inventor
Henry R. Seifert
By his Attorneys

Patented Aug. 31, 1926.

1,597,926

UNITED STATES PATENT OFFICE.

HENRY R. SEIFERT, OF EAST ELLSWORTH, WISCONSIN.

APPARATUS FOR USE IN FORMING PISTON RINGS.

Application filed January 12, 1923. Serial No. 612,344.

My present invention relates to an improved apparatus for use in forming piston rings of the type disclosed and broadly claimed in my U. S. Letters Patent for "Process and apparatus for forming piston rings", issued June 12, 1923, in which the piston rings, during their formation, are contracted and their ends sprung slightly inward, and while thus held, have their peripheries cut to a true circle so that when the piston rings are released their ends spring slightly outward of a true circle. The purpose of thus forming piston rings is to cause their ends, by their engagement with cylinder walls, to exert a yielding force tending to expand the piston rings and thereby cause the same to closely engage the cylinder walls throughout their entire circumference and thus form tight joints between the piston rings and cylinder walls to prevent leakage of the fuel mixture during compression and the pumping of oil in the cylinders, and also to insure equal wear between the piston rings and cylinder walls so that their contacting surfaces remain true and the joints therebetween, tight.

The primary object of my present invention is to provide an improved apparatus for causing a piston ring to contract in a true circle, except at its ends which are pressed slightly inward, irrespective of any irregularities in the periphery of the piston ring, due to casting, which would tend to distort the same, when pressure is applied to the periphery of the piston ring, to contract the same.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 4 is a fragmentary elevation of a mandrel having mounted thereon a plurality of piston rings, which are held contracted with their ends sprung inward by lateral pressure, and to certain of which piston rings are still applied the apparatus shown in Fig. 3;

Fig. 5 is a view partly in side elevation and partly in transverse section taken on the line 5—5 of Fig. 4;

Fig. 6 is a perspective view of one of the completed piston rings after the same has been removed from the mandrel;

Figure 1:
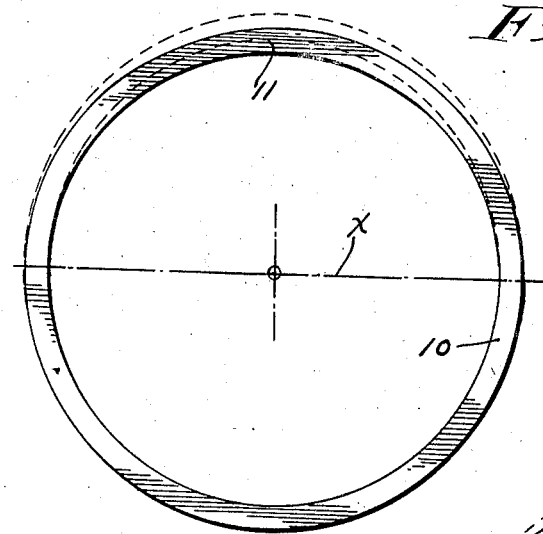
Fig. 1 is a view in side elevation of one of the improved piston rings as primarily cast and before a joint is formed therein.
Figure 2:
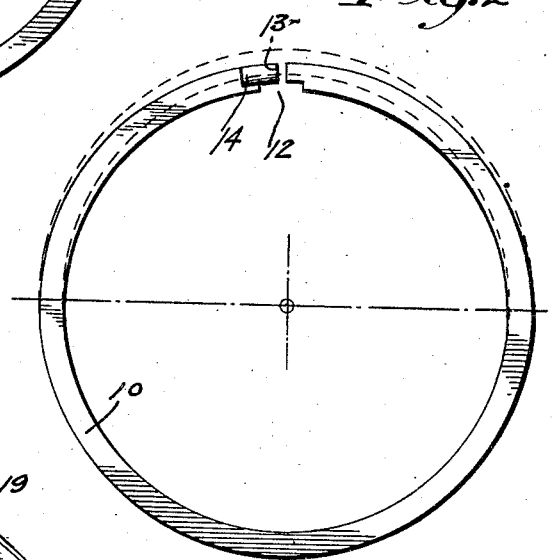
Fig. 2 is a view in side elevation of the piston ring after the joint members have been formed thereon.
Figure 3:
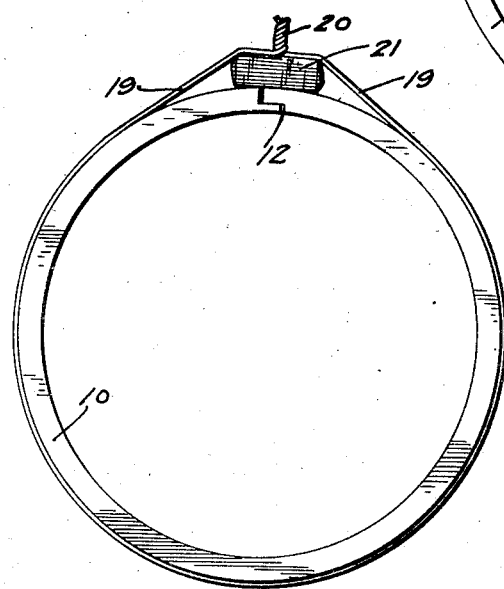
Fig. 3 is a view in side elevation of the piston ring, as shown in Fig. 2, with the exception that the same is compressed and its ends pressed slightly inward by one form of the improved apparatus.

Before describing my present invention in detail, it may be here stated that in forming a piston ring of the type disclosed in my patent heretofore referred to, there is cast or otherwise formed a continuous unbroken ring 10 having a greater circumference than that required when the ring is complete. A segment of this ring 10, above the line X in respect to the drawing, is formed on an inset eccentric 11, or in other words, on a flatter curve or curves than the balance or major portion of the ring, as shown in Fig. 1. The circle on which the major portion of the ring 10 is formed is extended through the arc of the inset eccentric portion 11, as indicated by broken lines in Fig. 1. This inset eccentric portion 11, for example, in a three-and-three-fourths by one-quarter standard Ford piston ring is radially inset on its shortest diameter, say twenty-four-one-thousandths of an inch. The length of the inset eccentric portion 11, of course, is only approximate and may vary one way or the other.

The ring 10 is primarily of such shape that after a joint is formed therein and the ring compressed, it assumes a true circle or substantially a true circle. Preferably, as shown, the inset eccentric portion 11 is inset, both externally and internally, and hence, the ring 10 has a constant thickness throughout its entire circumference. In some instances, however, a ring may be formed by insetting only its internal surface within the eccentric portion 11, but this, however, would require more pressure to spring the ends of the ring inward and more work in cutting the periphery of the piston ring to a true circle.

A joint 12 is next formed in the ring 10, which includes severing said ring on the shortest diameter Y of its inset eccentric portion 11. Preferably, this joint 12 comprises reduced laterally offset ends 13 and seats 14, the former of which, when the ring is compressed, overlap and enter said seats. The process of forming such a joint is fully described and broadly claimed in my U. S. Letters Patent for "Machine for forming piston rings and process of producing the same", issued June 19, 1923.

The ends of the ring 10 are next further temporarily inset, say seven one-thousandths, following the example already set, by an inward radial pressure applied at the periphery of the joint 12 while the ring 10 is held compressed. While the ring 10 is held thus compressed and its end sprung inward, its internal surface, including the inset portion, forms a true or substantially true circle.

A multiplicity of rings 10, while held compressed with their ends sprung inward, are placed on a mandrel 15, the diameter of which is substantially the same as the internal diameters of the compressed rings 10, and is of such length as to receive and hold any desired number of rings 10, as indicated in Fig. 4. On one end of the mandrel 15 is a stop shoulder or flange 16 for the rings 10, and on the other end thereof is a follower 17 which is moved toward the stop shoulder 16 by a nut 18 having screw-threaded engagement with the respective ends of said mandrel. The rings 10 are securely frictionally clamped, between the stop shoulder 16 and follower 17, by lateral pressure applied by the nut 18, so that said rings will not expand and their ends spring outward when the means for individually holding the rings 10 compressed and their ends sprung inward is removed therefrom. After the individual clamping means is removed from the rings 10, the mandrel 15 is placed in a lathe or machine, and the peripheries of the rings 10 cut or ground, throughout their entire circumference, to a true circle by any suitable tool or stone. When the completed piston rings 10 are removed from the mandrel 15, the ends thereof will spring slightly outward beyond the true circle of the rings, when held compressed, and are ready to be applied to a piston.

My present invention, as previously stated, has to do with the individually compressing of a ring 10, and the springing of its ends inward before the same is mounted on the mandrel 15 and thus held until secured between the stop shoulder 16 and follower 17.

Referring first to the apparatus shown in Figs. 1 to 5, inclusive, the same comprises a flexible wire clamping band 19, the ends of which are connected by twisting the same together as at 20. After this band 19 is applied around the periphery of the ring 10, an abutment 21 in the form of a loose rectangular metal slug is placed between the band 19, at its twisted ends 20, and the periphery of the ring 10 with its intermediate portion at the joint 12 so that its end portions bear upon both of the ends of said ring. The twisted ends 20 of the band 19 are further twisted to contract the band 19 and thereby compress the ring 10, as shown in Fig. 5, and at the same time acting through the abutment 21 spring the end portions of said ring slightly inward. After a multiplicity of the rings 10 are next placed on the mandrel 15, and secured as previously described between the stop shoulder 16 and follower 17, the bands 19 are then removed from the individual rings 10 by untwisting their ends 20, which at the same time releases the abutments 21. Such a type of band may be used several times before the twisted ends will break. A clamping band of this type will yield to fit itself around any irregularities, on a periphery of a ring, formed during the casting process and thereby permit a ring to contract to a true circle. It has been found that a rigid clamping band will sometimes spring or distort a ring slightly if the periphery thereof is not substantially true.

Figure 7:
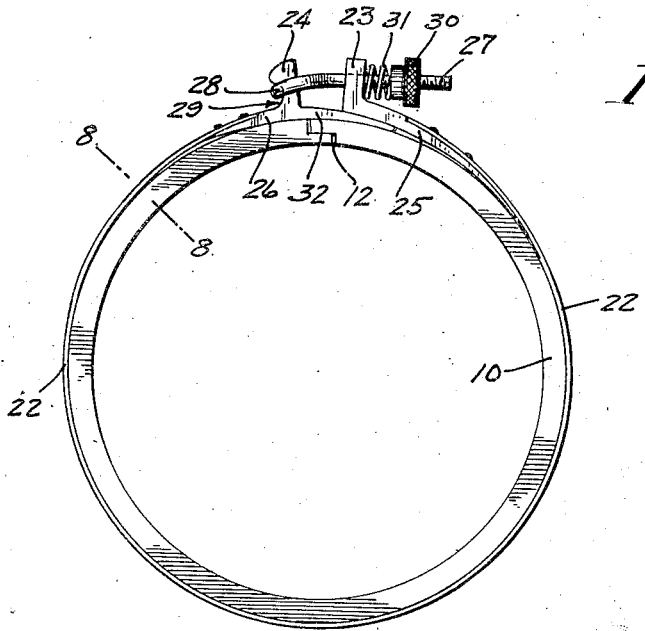
Fig. 7 is a view corresponding to Fig. 3, but illustrating another form of the improved apparatus.
Figure 9:
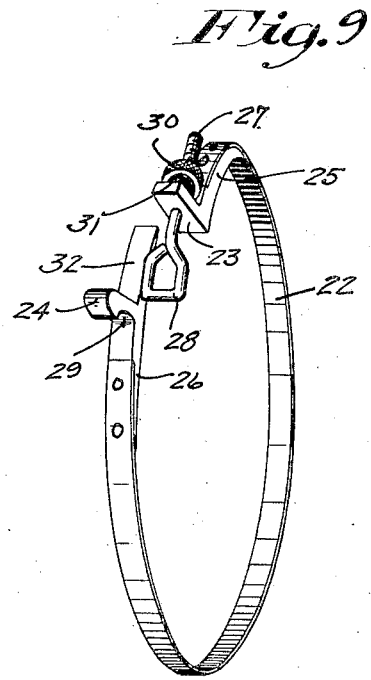
Fig. 9 is a perspective view of the apparatus shown in Fig. 7 removed from the piston ring and in a released position.
Figure 8:
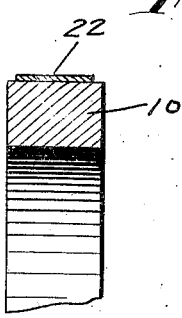
Fig. 8 is a detail view in section taken on the line 8—8 of Fig. 7, on an enlarged scale.

Referring now to the apparatus shown in Figs. 7, 8 and 9, the numeral 22 indicates a flat band of spring steel applicable to the periphery of a ring 10 and having at one end an outstanding radial lug 23, and at its other end an outstanding radial lug 24. These lugs 23 and 24 have oppositely extended tapered extensions 25 and 26, respectively, with which the ends of the band 22 overlap, and are permanently secured thereto by rivets or otherwise. The inner surfaces of the extensions 25 and 26 are formed on curves to substantially fit the periphery of the ring 10. An eye-bolt 27 is mounted in the lug 23 with freedom for endwise sliding movement, and its eye or head 28 is arranged to receive the lug 24 which is undercut at 29 to hold said head interlocked therewith, as shown in Fig. 7. Applied to the screw-threaded end of the bolt 27 is a thumb nut 30 which reacts indirectly against the lug 23 as a base of resistance, during the adjustment of the nut 30, to shorten the operative length of the bolt 27 and thereby draw the two lugs 23 and 24 toward each other to contract the band 22 and thereby compress the ring 10.

Encircling the bolt 27 is a coiled spring 31 arranged to be compressed between the lug 23 and the thumb nut 30. This coiled spring 31 will permit the bolt 27 to be moved endwise to the lug 23 and thereby separate the ends of the band 22 without changing the adjustment of the nut 30 which will always remain the same when applying the apparatus to rings of a given diameter.

Formed with the lug 24 is a wedge-shaped abutment 32 which extends over the joint 12 and under the lug 23 and its extension 25, and springs the ends of the ring 10 slightly inward during the contracting movement of the band 22 to compress the ring 10.

The flexible band 22, like the band 19, will yield if engaged by a projection or uneven surface on the periphery of the ring 10 without distorting the ring, and thereby prevents the same from contracting on a true circle.

What I claim is:

1. A device for use in forming piston rings which includes a clamp applicable to the periphery of a ring and comprising a flexible band, the ends of which may be connected to contract the same onto a ring and compress the same, and an abutment interposed between the band and the ends of the ring to spring said ends inward.

2. The structure defined in claim 1 in which the ends of the band may be connected to circumferentially contract the band to a greater or less degree.

3. A device for use in forming piston rings which includes a clamp applicable to the periphery of a ring and comprising a wire, the ends of which are arranged to be twisted together to contract the clamp onto a ring to compress the same, and an abutment in the form of a slug interposed between the clamp and the ends of the ring.

In testimony whereof I affix my signature.

HENRY R. SEIFERT.